Sept. 8, 1953 E. J. COURTNEY 2,651,581
METHOD OF MAKING A CUFRAMMONIUM CELLULOSE SOLUTION
Filed July 30, 1952 3 Sheets-Sheet 1

INVENTOR
Edward J. Courtney

Owen + Owen
ATTORNEYS

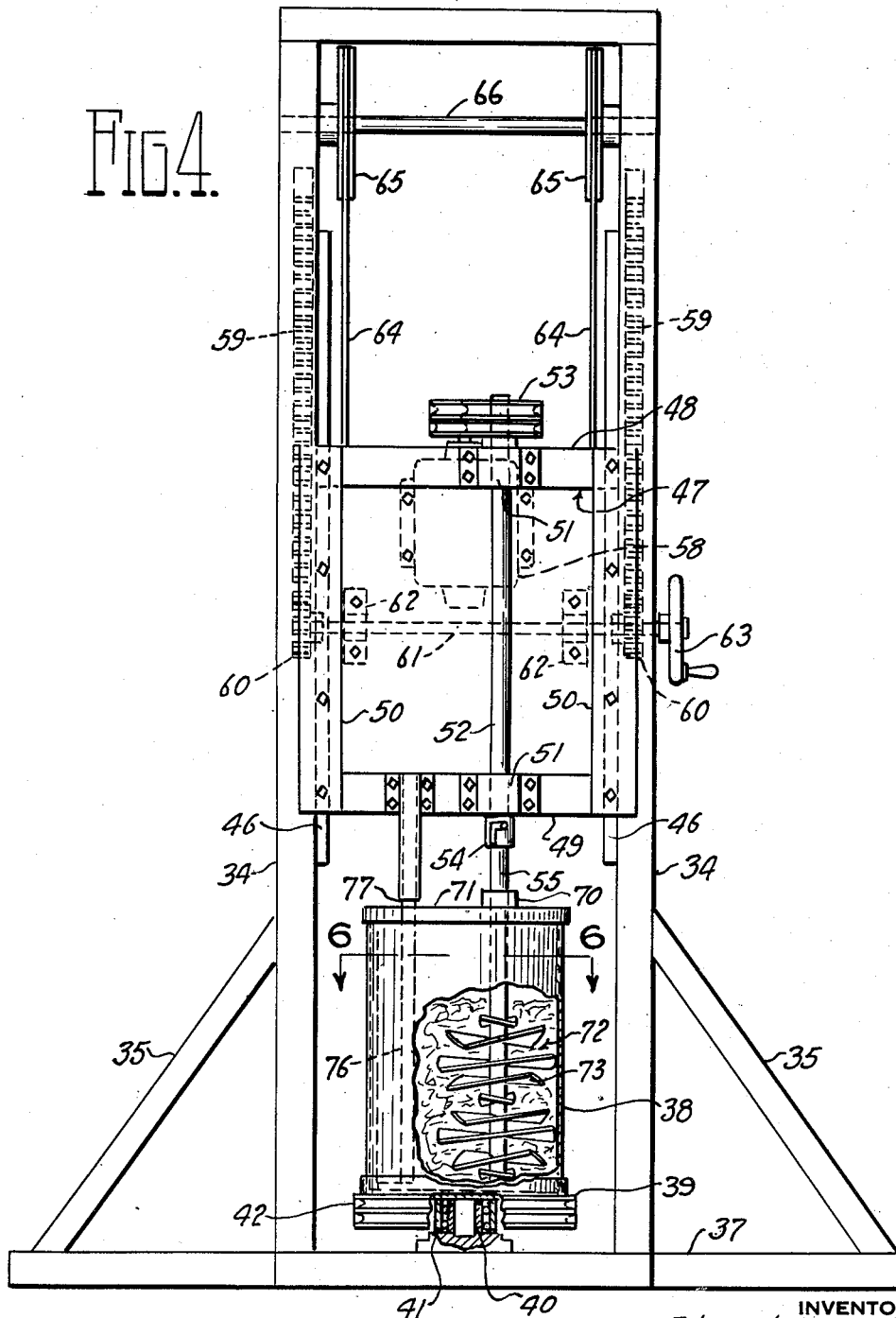

Sept. 8, 1953 E. J. COURTNEY 2,651,581
METHOD OF MAKING A CUPRAMMONIUM CELLULOSE SOLUTION
Filed July 30, 1952 3 Sheets-Sheet 3
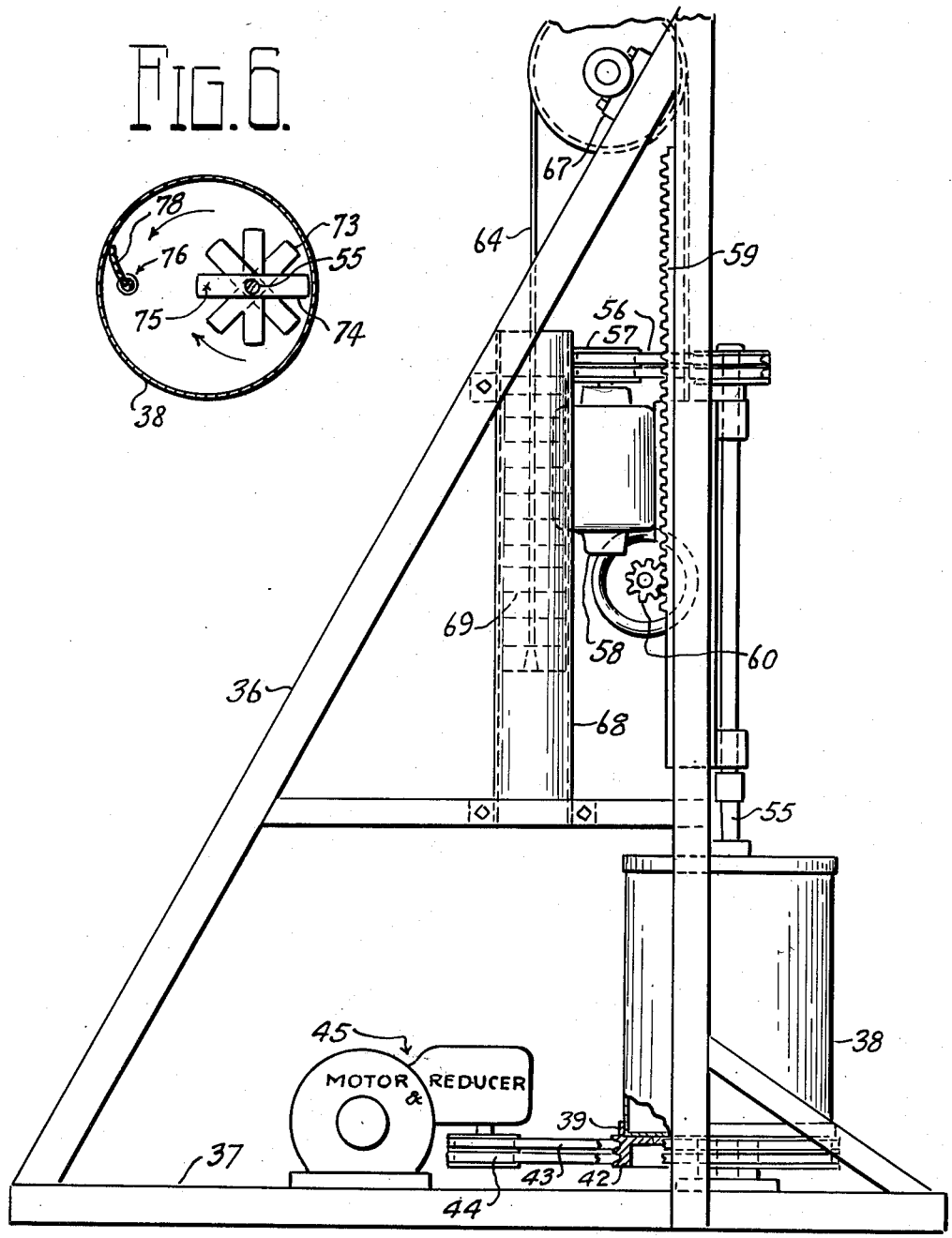
INVENTOR
Edward J. Courtney Patented Sept. 8, 1953

2,651,581

UNITED STATES PATENT OFFICE 2,651,581

METHOD OF MAKING A CUPRAMMONIUM CELLULOSE SOLUTION

Edward J. Courtney, Oaklyn, N. J., assignor to Cellulose Fibers Incorporated, Toledo, Ohio, a corporation of Ohio Application July 30, 1952, Serial No. 301,660

4 Claims. (Cl. 106—167)

This application is a continuation-in-part of my copending application Serial No. 255,666 filed November 9, 1951, and now abandoned.

The invention relates to a substantially fiber-free cuprammonium cellulose solution which is capable of being spun into rayon filaments of varying deniers, of being spread and calendered for the production of transparent sheet material essentially consisting of regenerated cellulose and popularly known as cellophane, and for the production of masses of regenerated cellulose essentially free of impurities and capable of being transformed by subsequent treatment into other cellulose products such as cellulose sponges and the like.

The art of producing cuprammonium cellulose solutions has been developed in the past to an extent such that the materials and the general proportions of each used in producing such solutions are quite well known. It has been learned, for example, that perhaps the simplest ingredients are caustic soda, copper sulfate and aqueous ammonia; the art, however, proceeding on the basis for the most part that the most effective results are achieved when the cellulose pulp is pre-causticized, as by steeping with an excessive quantity of caustic, and the excess removed by squeezing prior to the addition of copper and ammonia. In fact, in most commercial operations the pre-steeping step is invariably employed.

Additionally, most prior art experimenters, as well as the commercial producers of cuprammonium cellulose solutions, have prepared them under controlled temperature conditions, usually with all of the equipment involved being jacketed and cooled by brine or other coolant or, in the case of laboratory work, by the addition of ice to the solutions, to temperatures in the order of, say, 4° C. The difficulty and expense involved in cooling these solutions, both to control the exothermic heat of reaction and the volatilization of the ammonia, is expensive and requires considerable care.

The cuprammonium division of the rayon fabricating art has lagged behind the development of the viscous division of the art. Even though considerable attention has been devoted to cuprammonium cellulose solutions and their production, those processes which have become commercially usable are slow and involve mixing techniques extending over substantial periods of time. Most of these processes are based upon the belief that it is necessary to pre-steep the pulp, and to slowly mix the cellulose and other solution ingredients at low temperature in order to achieve an actual dissolved cellulose which can be regenerated into a commercially usable form.

Even under these long controlled processes the art apparently has been unable to so completely dissolve the cellulose as to eliminate the necessity for laborious filtering operations in order to achieve substantially fiber-free solutions which can be spun or otherwise further processed for the production of rayon, cellophane, sponges and the like.

It is, therefore, the principal object of this invention to provide a process for the production of cuprammonium cellulose solutions in a short time without the necessity for artificial cooling and so nearly fiber-free as to permit their commercial use in the production of rayon filaments and other materials without the necessity for extensive filtration.

It is another object of this invention to produce a cuprammonium cellulose solution which is substantially fiber-free immediately, i. e., in which substantially all of the cellulose fibers are dissolved so that the solution can be further processed without filtering.

It is another object of this invention to provide a process for the preparation of cuprammonium cellulose solutions in which the order of addition of the solution ingredients is not critical and thus to simplify the process by enabling these solutions to be prepared at will and admixed with the cellulose simultaneously, if desired, so as to subject the cellulose and the solution ingredients to a violent agitation for a very short period of time compared to prior art processes, whereby the tendency of the solution ingredients to "spoil" or to vaporize is rendered unimportant.

These objectives are achieved by violently beating or agitating the cellulose with such power that admixtures containing certain proportionate parts of several ingredients for each part of cellulose are forced into solution and "go up" (i. e., pass through the characteristically sudden increase in viscosity) within probably not more than 15 or 20 minutes and, in practice, within a period of time as short as from 20 seconds to 3 minutes from the time of commencing the agitation.

As mentioned, the processes of the art are generally characterized by the presence of one or more of the cooling, steeping and lengthy mixing steps. By reason of my discovery I am able to eliminate all three of these previously deemed important operations in the production of cuprammonium cellulose solutions.

In the prior art wood pulp or cotton linters or other relatively fine cellulose material, for example, containing, say, 95% of alpha cellulose, is first mixed with a caustic soda solution by stirring or steeping the cellulose in the solution for a substantial length of time, say, 30 minutes to several hours in order to impregnate the cellulose with the caustic. This stirring action breaks up the cellulose mass into shreds and lumps generally of rice kernel size and shape. The impregnation of the pulp by the caustic solution under these conditions is less than complete and, therefore, many prior processes expose the cellulose to an excessive amount of caustic and after even longer steeping times press the cellulose to remove the excess caustic. The pressing operation, of course, aids in impregnating the pulp with the caustic but does not produce a uniformly impregnated pulp any more than the initial stirring uniformly impregnates the pulp.

In contrast to this preliminary step of steeping or initial impregnation of the pulp with the caustic soda solution, my process contemplates that the caustic will be added to the pulp simultaneously with or either before or after the other solution ingredients and that the peculiarly violent agitation to which the pulp is subjected will disperse the solution or solutions through the pulp fibers to a degree so great as to result in substantially complete dissolution of the fibers.

Similarly, the admixture of the water-soluble copper salt, for example copper sulfate, and the ammonia with the pulp has for the most part been performed by slow stirring and by the addition of the pulp to a bath composed of the proper proportions of several ingredients, including water. By adding the pulp to the solution and by stirring it in this manner the pulp is gradually forced into solution in the ingredients and in order to achieve a degree of solution so that the admixture is even capable of filtering to produce a usable material, a lengthy and expensive stirring operation is required.

On the other hand, in my improved process, I beat or violently agitate the pulp to such an extent that the mass of pulp is broken up to a degree far in excess of that possible to achieve where the pulp is added to a solution and stirred therein. The beating as performed in my process is characterized by the fact that the pulp is broken to such an extent that there are no shreds or lumps of pulp and the fibers are rendered open and free from each other. In general, the pulp is so violently agitated that when the solution ingredients are added they do not form a separate liquid phase but are immediately dispersed upon and absorbed by the fibers, such thorough dispersal and absorption being so rapidly achieved by the power applied to the agitation that the mass enters into solution and "goes up" in a period of time in the order of from three minutes to, say, not more than 15 minutes.

Preferably, the ingredients of the solution, i. e., the copper solution, caustic solution and ammonia solution are added gradually to the pulp while the pulp is continuously agitated with violent power in the order of that explained. As the ingredients are added, whether simultaneously or in whatever order may be desired, the fluffy expanding mass of cellulose does not change its general physical characteristics, i. e., it remains as an open, loose mass of wetted fibers with all of the fibers gradually receiving a sufficient amount of solution and with no appreciable excess of solution being present in any portion of the loose violently agitated mass.

As this thorough dispersion of the solution constituents and their admixture takes place, it can be observed by watching the color of the pulp uniformly and gradually change to the color, for example, of the copper solution. The entire mass of pulp reaches the proper proportions with respect to the solvent ingredients almost simultaneously throughout the mass and the fibers pass into solution. This occurrence results in a very rapid and uniform change in viscosity throughout the mass and is readily apparent to an operator because of the tremendously great load suddenly acting against the agitating mechanism. This phenomenon has been denominated as "going up" and in the process of my invention it occurs with startling rapidity.

As is well-known in the regenerated cellulose art, whether its subsequent treatment is based upon a viscose solution or upon a cuprammonium solution, optimum characteristics of produced materials are achieved with certain viscosities of the solutions from which they are produced. The control of the final viscosities of the cuprammonium solutions produced according to my invention is very simple because water can be added to the admixture as a carrier for each of the solution ingredients and the quantity of water finally present in the solution is thus controllable with nicety.

In order to more completely explain and clearly set out the degree of violent agitation necessary to achieve the novel rapid production of a cuprammonium cellulose solution according to the invention there are shown in the drawings attached hereto two mechanisms for carrying out the agitation steps which have been designed and operated according to the invention for the production of cuprammonium cellulose solutions embodying the invention and being so nearly fiber-free as to be usable without subsequent filtering operations. In these drawings:

Fig. 4 is a view in front elevation, with parts broken away, of a commercial apparatus for the production of a cuprammonium cellulose solution according to the invention.

Fig. 5 is a side view in elevation of the commercial apparatus shown in Fig. 4.

Fig. 6 is a horizontal sectional view taken substantially on the line 6—6 of Fig. 4.

Figure 1:
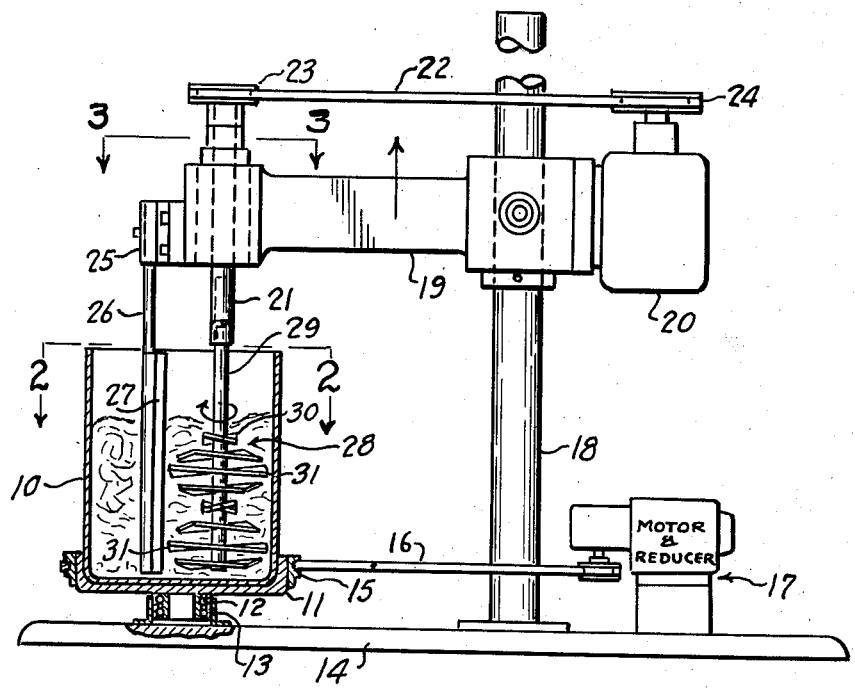
Fig. 1 is a view in elevation, with parts shown in section, of a pilot plant apparatus for carrying out the process of the invention.

As explained above, a process embodying the invention involves operating upon the cellulose and the cuprammonium solution ingredients with a degree of violent agitation sufficient to cause solution of the cellulose in the solution ingredients to a substantially complete degree, the degree being measured by the fact that the final solution is so nearly fiber-free as to be usable without filtering and that such solution is achieved within a period of from three to about 15 minutes from the time the process is commenced.

In the two apparatuses illustrated in the drawings, details of construction are shown, and in the following description specific sizes and speeds are given, in order to clearly point out how the process of the invention is carried out.

Figures 2, 3:
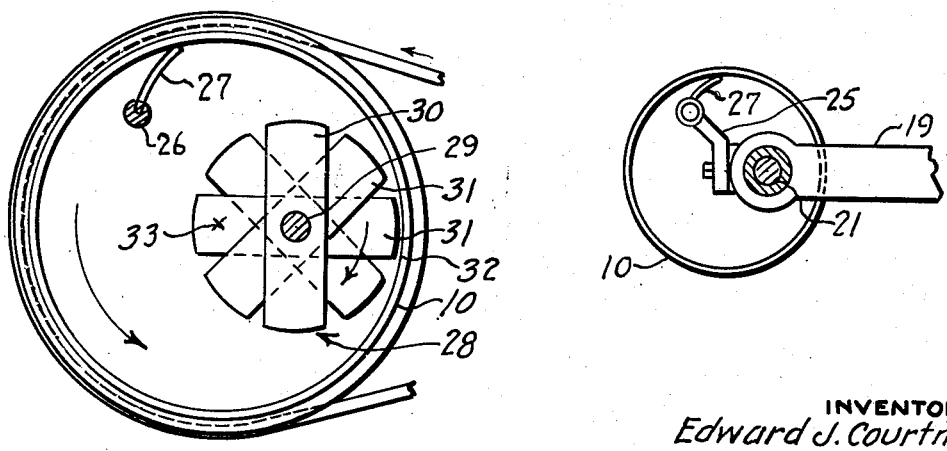
Fig. 2 is an enlarged horizontal view taken on the line 2—2 of Fig. 1.
Fig. 3 is a fragmentary detailed sectional view taken on the line 3—3 of Fig. 1.

For example, in the apparatus of Figs. 1, 2 and 3 a mixing container or can 10, measuring approximately 6" inside diameter by 7¼" depth, is mounted in a turntable 11 which is journalled by a short vertical shaft 12 in a bearing 13 mounted upon a base 14. The table 11 carries a peripheral pulley 15 which is engaged by a driving belt 16 driven in turn from a motor and speed reducer unit generally indicated at 17.

A post 18 supports an arm 19 which, in turn, carries a beater motor 20 and a beater spindle 21. The spindle 21 is driven by the motor 20 through the medium of a belt 22 engaged in a spindle pulley 23 and motor pulley 24 respectively. In the apparatus illustrated in Figs. 1–3 the respective sizes of the pulleys 23 and 24 are such that the speed of the beater spindle 21 is 2000 R. P. M. or an increase over the standard speed of 1750 R. P. M. of the motor 20. Also mounted on the end of the arm 19 which rotatably supports the beater spindle 21 is an arm 25 which supports a scraper 26. The scraper 26 extends downwardly into the can 10 and has a flexible scraper blade 27 that scrapes the inner surface of the can 10. As can be seen in Fig. 1, the scraper blade 27 extends to the bottom of the can 10, there being merely an operating clearance between the bottom edge of the scraper blade 27 and the bottom of the can 10.

The spindle 21 removably mounts a beater 28 having a shaft 39 and a plurality of propeller-like blades consisting of an upper blade 30 and, in this instance, seven lower blades 31. It will be observed that the upper blade 30 is pitched in such direction as to force solution in the can 10 downwardly while the lower blades 31 are all pitched to force the solution upwardly. In the apparatus illustrated in Figs. 1–3 having a can of the dimensions given and rotating at the speeds given, each of the beater blades 30 or 31 is 3½" long and 1¼" in width. The axis of the beater shaft 29 is located at such point that the ends of the beater blades 30 and 31 have only a small operating clearance from the interior of the can 10. This situation is best seen in Fig. 2 where the clearance is indicated by the reference number 32 and where it can be seen that the blades 30 and 31 extend beyond the axis of rotation of the can 10, indicated by the reference number 33. Also in Fig. 2 it will be observed that the can 10 rotates in a counterclockwise direction and the beater 28 rotates in a clockwise direction. The scraper blade 27 is so located with respect to the beater 28 that it is just beyond the beater 28 with respect to the direction of rotation of the can 10. In the apparatus illustrated in Figs. 1–3 the beater blades 30 and 31 occupy a vertical space of 4", the blades being relatively thin but also being located closely adjacent each other vertically. The blades 30 and 31 are staggered on the shaft 29 with each blade being rotated approximately 45° with respect to the adjacent blades.

As will be seen by reference to Examples 2, 3 and 4 below, apparatus of the type illustrated in Figs. 1 to 3, having the dimensions set forth above and operating at the speeds and in the directions explained, is effective in the practice of the process embodying the invention on a pilot plant scale.

In changing the design of the apparatus of the pilot plant type as shown in Figs. 1–3 to such size as is appropriate for commercial production, some variation in the precise relationships between the speeds of the beater and container are permissible and constructional details may be varied as necessary to produce a sturdy and powerful machine. The apparatus illustrated in Figs. 4–6, inclusive, is, therefore, again merely illustrative of apparatus of commercial plant size and capacity, carrying out the fundamentals of design and operation required to practice the process of the invention.

In the commercial apparatus of Figs. 4–6, inclusive, a main frame comprises spaced parallel uprights 34, side braces 35 and rear braces 36 (Fig. 5) which are welded or otherwise firmly secured to each other and to a base structure 37. A mixing can 38, in this case having an inside diameter of 12¾" and a depth of 16¾", is supported upon a turntable 39 which is, in turn, supported by a stub shaft 40 that is mounted in a bearing 41 fixed on the base 37. The turntable 39 has a double sheave pulley 42 around its perimeter and a pair of driving belts 43 are engaged in the pulley 42 and in a double pulley 44 driven by a motor and speed reducer generally indicated at 45. In the commercial apparatus constructed in accordance with Figs. 4–6, the dimensions of the pulleys 42 and 44 and the construction of the motor and speed reducer 45 are such as to rotate the can 38 at 30 R. P. M. in a counterclockwise direction, as is best seen in Fig. 6.

Each of the uprights 34 has a vertically extending way 46 which, acting together, slidably mount a vertically movable frame 47. The frame 47 has spaced horizontal cross members 48 and 49 and vertical frame members 50 which engage the ways 46. A pair of bearing blocks 51 mounted on the cross arms 48 and 49 rotatably support a spindle 52 on the upper end of which is mounted a double belt pulley 53 and the lower end of which is provided with a socket 54 for a beater shaft 55. The pulley 53 is engaged by a pair of driving belts 56 which also are engaged in a motor pulley 57 mounted on the shaft of a driving motor 58 which may be bolted or otherwise secured to the sliding frame 47.

Two racks 59 are secured on the rear of the uprights 34 and engaged by two pinions 60 which are pinned on a horizontally extending shaft 61 journalled in bearings 62 bolted or otherwise secured to the sliding frame 47. A hand wheel 63 is secured on one end of the shaft 61. Rotation of the hand wheel 63 rotates the pinions 60 which run up the racks 59 to raise the sliding frame 47 and the mechanism supported thereby. Suitable retaining or "dogging" means may be provided for locking the pinions 60 in the racks 59 when desired. Cables 64 are secured to the sliding frame 47 and led up and over idler pulleys 65 mounted upon a shaft 66 journalled in bearing blocks 67 (Fig. 5) supported by the back braces 36. The cables 64 extend downwardly into counterbalancing weight guide tubes 68 and a plurality of weights 69 are secured on each of the cables 64 to counterbalance the weight of the sliding frame 47 and the mechanism carried thereby.

The beater shaft 55 extends downwardly through a collar 70 (Fig. 4) in a lid 71 of the can 38 into the interior of the can 38. A beater 72 which consists, in this instance, of nine cutter blades 73, extends vertically through a distance of 10½", each of the blades 73 being 8" long and approximately 1½" wide, all of the blades 73 being pitched to force solution downwardly. The lowermost one of the blades 73 is located only a sufficient distance above the bottom of the can 38 to provide for operating clearance. The axis of the shaft 55 (Fig. 6), as is the case with the cutter group shown in the mechanism of Figs. 1–3, is shown positioned relative to the axis of rotation of the can 38 that it rotates the blades 73 with only an operating clearance indicated at 74 in Fig. 6 from the side of the can 38. Again, the blades 73 extend into the can 38 beyond its axis of rotation which is indicated by the reference number 75 in Fig. 6.

A scraper 76 is supported by a bar 77 from the lower cross arm 49 and has a semi-flexible blade 78 which scrapes the interior of the can 38, being located "beyond" the beater 72 with respect to the direction of rotation of the can 38. In the apparatus illustrated in Figs. 4–6 the beater is rotated at 1750 R. P. M.

As will be more clearly explained in Examples 1 and 4 below, commercial operation in accordance with the process embodying the invention for the production of substantially fiber-free cuprammonium cellulose solution according to the invention is made possible through the use of beating equipment in general following the above description, having the dimensions and operating at the speeds and in the directions as set forth. It will be apparent that various changes and modifications can be made from the procedures described which are to be construed as illustrating, but not as limiting the invention.

Example 1

A cuprammonium cellulose solution was produced from cellulose, a causticizing agent therefor, a copper ammonium complex, and water according to the following procedure:

Alpha-cellulose pulp, in the form of a sheet one-sixteenth inch thick, was cut into three inch squares. A 1 pound 7 ounce charge of these alpha-cellulose squares was placed in the mixing can 38 of the commercial apparatus shown in Figs. 4–6 of the drawings, and revolution of the beater 72 in the direction of the arrow in Fig. 6 at about 1750 R. P. M. was started to effect shredding and fluffing and continued throughout the following operations to produce violent agitation. The mixing can 38 was rotated in the direction of the arrow in Fig. 6 at about 30 R. P. M. during this and subsequent steps in the operation. After shredding and fluffing had proceeded at about 2 minutes a 376 gram portion of sodium hydroxide dissolved in three liters of water was added to the mixer. About 1 minute after the NaOH addition a solution containing 2 pounds 8¼ ounces of $CuSO_4.5H_2O$, 5 liters of 26° Baumé ammonia and 3.3 liters of water was added to the mixing can. Ammonium hydroxide of 26° Baumé contains about 29 per cent of $NH_3$. The terms "per cent" and "parts" are used herein, and in the appended claims, to mean per cent and parts by weight, unless otherwise indicated. About 1½ minutes after this addition agitation was discontinued. A sample of the resulting cuprammonium cellulose solution was removed from the mixer on a glass stirring rod and placed between microscope slides. Upon examination of the slide by the naked eye, under a microscope, or when polarizing filters were held on either side of the microscope slides[1] no cellulose fibers were observed. The total elapsed time from starting of violent agitation to fiber-free solution was about 4½ minutes.

Example 2

A series of experiments demonstrating the use of comminuted alpha-cellulose wood pulp as a preferred source for cellulose, and the independence of the invention from the order of addition of ingredients, was carried out in accordance with the following procedures:

(a) A 30 gram portion of alpha-cellulose pulp previously comminuted in a "Model D" Fitzpatrick comminuting machine using a #4 screen which has approximately ¼" diameter holes, about 9 per square inch, was charged into the can 10 of the apparatus shown in Figs. 1–3 of the attached drawings, and revolution of the beater 28 in the direction of the arrow in Fig. 1 at about 2000 revolutions per minute was started to effect shredding and fluffing and continued throughout the following operations to produce the required violent mixing agitation. The can 10 was rotated in the direction of the arrow in Fig. 2 at about 24 R. P. M. during this and subsequent steps of the operation. A solution of 65 grams of $CuSO_4.5H_2O$, dissolved in 187 cc. of water was then added to the can, followed immediately by a solution of 20 grams of sodium hydroxide dissolved in 187 cc. of water, which, in turn, was followed immediately by 250 cc. of 26° Baumé ammonium hydroxide. Approximately two minutes after the ammonium hydroxide addition revolution of the beater 28 and rotation of the can 10 were discontinued, and a sample of resulting cuprammonium cellulose solution was removed from the can on a glass stirring rod and placed between microscope slides. Upon examination of the slide by the naked eye, under a microscope, or when polarizing filters were held on either side of the microscope slides, no cellulose fibers were observed. The total elapsed time from starting of violent agitation to fiber-free solution was about 3 minutes.

(b) A 30 gram portion of alpha-cellulose pulp comminuted as described in the preceding paragraph was placed in the can 10 and revolution of the beater 28 and rotation of the can 10 as there described were begun. A 350 cc. addition of 26° Baumé ammonium hydroxide was then made, followed immediately by a solution containing 20 grams of sodium hydroxide dissolved in 187 cc. of water, which, in turn, was followed immediately by a solution of 65 grams of $CuSO_4.5H_2O$ dissolved in 187 cc. of water. Approximately 2 minutes after the addition of the $CuSO_4.5H_2O$ solution, revolution of the beater blades and rotation of the can were discontinued, and a sample of the resulting cuprammonium cellulose solution was removed from the can on a glass stirring rod and placed between microscope slides. Under examination as hereinbefore described, no cellulose fibers were observed. The total elapsed time from starting of violent agitation to fiber-free solution was about 3 minutes.

(c) A procedure identical with that described in the two preceding paragraphs was carried out except that the sodium hydroxide solution was added to the pulp first, followed immediately by the ammonium hydroxide, which, in turn, was followed immediately by the copper sulfate. Identical results were achieved.

(d) A procedure identical with those previously described, in the present example, was carried out except that the sodium hydroxide solution was mixed with a previously combined solution of the $CuSO_4.5H_2O$ in water and the ammonium hydroxide immediately prior to addition of the resulting mixture to the cellulose in the can, and except that revolution of the beater 28 and rotation of the can 10 were discontinued about 20 seconds after addition of the above mixture to the cellulose. Substantially identical results were

---

[1] It has been observed experimentally that cellulose fibers, when viewed in this way, appear as well defined light spots, apparently because they transmit the polarized light while the surrounding solution does not.

achieved. It has been found that best results are obtained when a single addition is made to the pulp, as described in this paragraph, when the cuprammonium solution is freshly prepared, and when the causticizing agent is added thereto just prior to admixture with the pulp.

(e) A solution containing 40 grams of sodium hydroxide dissolved in 450 cc. of water was mixed with a previously combined fresh solution of 130 grams of $CuSO_4.5H_2O$ dissolved in 450 cc. of water with 350 cc. of 26° Baumé ammonium hydroxide, and the resulting mixture was added immediately to the can 10. A 70 gram portion of alpha-cellulose pulp comminuted as described above was then added to the can 10, and revolution of the beater 28 and rotation of the can as described were started. After about 2 minutes of violent agitation of the comminuted pulp with the combined mixture of sodium hydroxide, $CuSO_4.5H_2O$, ammonia, and water, revolution of the beater 28 and rotation of the can 10 were discontinued. Results substantially identical with those described above were achieved.

(f) Procedures similar to those previously described in this example were also carried out, but adding the ingredients in all other possible orders and combinations. By all such procedures substantially fiber-free solutions were achieved except when the NaOH was mixed with the $CuSO_4.5H_2O$ an appreciable time before introduction into the can 10. In these instances there was opportunity for precipitation of $Cu(OH)_2$, which is known to the art to be disadvantageous; therefore when the sodium hydroxide and copper salt are to be premixed before addition to the can, optimum results may be expected when the time interval between premixing and introduction is kept very short. In every instance the total elapsed time from initiation of violent agitation to fiber-free solution was less than 5 minutes.

*Example 3*

A preferred way of making a cuprammonium cellulose solution from cellulose, a causticizing agent therefor, a copper ammonium complex, and water is demonstrated by the following procedures:

(a) A 70 gram portion of alpha-cellulose pulp comminuted as described in Example 2 was placed in the can 10 of the apparatus shown in Figs. 1–3 of the drawings, and revolution of the beater and rotation of the can as there described were started and continued. A solution containing 40 grams of sodium hydroxide dissolved in 450 cc. of water was added to the comminuted pulp in the mixer. About 1 minute after the sodium hydroxide addition a fresh solution made by mixing 130 grams of $CuSO_4.5H_2O$ dissolved in 450 cc. of water with 350 cc. of 26° Baumé ammonium hydroxide was added to the causticized pulp in the can. About 2 minutes after the addition of the cuprammonium solution violent agitation was discontinued, and rotation of the can was stopped. A sample of the resulting cuprammonium cellulose solution was removed on a glass stirring rod and placed between microscope slides. Upon examination of the slide by the naked eye, under a microscope, or when polarizing filters were held on either side of the microscope slides, no cellulose fibers were observed. The total elapsed time from starting of violent agitation to fiber-free solution was about 3 minutes.

(b) A 700 gram portion of alpha-cellulose pulp comminuted as described in Example 2 was placed in the mixing can 38 of the commercial apparatus shown in Figs. 4–6 of the drawings, and revolution of the beater 42 in the direction of the arrow in Fig. 6 at about 1750 R. P. M. was started, and continued throughout the following operations. The mixing can was rotated in the direction of the arrow in Fig. 6 at about 30 R. P. M. during this and subsequent steps in the operation. A solution containing 400 grams of sodium hydroxide dissolved in 4.5 liters of water was added to the comminuted pulp in the mixer. About 1 minute after the sodium hydroxide addition a fresh cuprammonium solution made by mixing 1.3 kilograms of $CuSO_4.5H_2O$ dissolved in 4.5 liters of water with 3.5 liters of 26° Baumé ammonium hydroxide was added to the causticized pulp in the can. About 2 minutes after the addition of the cuprammonium solution agitation was discontinued, and rotation of the can was stopped. A sample of the resulting cuprammonium cellulose solution was removed and examined, between microscope slides, by the naked eye, under a microscope, and through polarizing filters, as described. No cellulose fibers were visible. The total elapsed time from starting of violent agitation to fiber-free solution was about 3 minutes.

Samples of cuprammonium cellulose solution produced by procedures described in the preceding examples have been extruded through spinnerettes in a known manner into a solution of sodium hydroxide in water to produce commercially acceptable rayon tow in a conventional manner.

It will be apparent to those versed in the art that any other causticizing agent for cellulose such as any other alkali metal hydroxide can be substituted for NaOH used in the examples, that any copper compound capable of reaction with ammonia to produce a water soluble cuprammonium complex can be substituted for the $CuSO_4.5H_2O$ shown in the examples, that any source for cellulose suitable for regeneration can be used in place of the relatively pure alpha-cellulose containing about 95 per cent thereof used in the examples, and that anhydrous $NH_3$ can be substituted for aqueous ammonia actually employed in the examples provided that there is present sufficient water to dissolve the anhydrous $NH_3$. Examples of other copper compounds that have been used for the production of cuprammonium cellulose solutions include $CuCl_2$, $CuSO_4$, $Cu(OH)_2$, and copper hydrate ($CuSO_4.XCu(OH)_2$). Best results, as set forth in the examples, have been achieved using sodium hydroxide as the causticizing agent, $CuSO_4.5H_2O$ and aqueous ammonium hydroxide to form a water soluble copper ammonium complex, and water, when there has been present per part of cellulose, from about 0.57 part to about 0.67 part of sodium hydroxide, from about 1.86 to about 2.16 parts of $CuSO_4.5H_2O$, from about 1.3 to about 3.1 parts of $NH_3$, and from about 16.0 to about 19.9 parts of water. If an alkali metal hydroxide other than sodium hydroxide is used as the causticizing agent, the total number of mols thereof should be approximately the same as when sodium hydroxide is used. Similarly, if a copper compound other than $CuSO_4.5H_2O$ is employed the total number of mols thereof should be approximately the same as when the hydrated copper sulfate is used.

Although the molecular weight of cellulose is unknown, it is known that the cellulose molecule is composed of a long chain of cellobiose molecules joined together, and that cellobiose is a beta disaccharide. Accordingly, the molecular formula for cellulose can be represented as follows: $(C_6H_{10}O_5)_n$ where $n$ is an integer and probably varies from cellulose molecule to cellulose molecule. However, when cellulose undergoes the reactions involved in producing a cellulose solution, the value of $n$ in the foregoing molecular formula for cellulose is immaterial, and can be assumed to be equal to 1 for purposes of calculating proportions of reactants. Accordingly, the molecular weight of cellulose is assumed, herein, and in the appended claims, to equal 162 the molecular weight when $n$ in the above formula equals one. It will be apparent that where proportions of starting materials are recited in mols or molecular equivalents herein and in the appended claims consistency in units, for example, gram mols or pound mols, is essential throughout a formulation.

The proportions of cellulose, sodium hydroxide, hydrated copper sulfate, water and ammonia hereinbefore given can readily be converted to molecular proportions when the molecular weight of cellulose is assumed to be 162, as stated in the preceding paragraph. Therefore, it is usually preferred that the materials employed in producing a cuprammonium cellulose solution according to the invention comprise, in the indicated proportions, 1 mol of alpha cellulose, from about 2.3 to about 2.7 mols of a causticizing agent therefor, a soluble inorganic copper compound containing from about 1.2 to about 1.4 mols of copper, from about 144 to about 179 mols of water and from about 12.6 to about 29.5 mols of ammonia to form a copper ammonium complex.

Analysis reveals that in the foregoing reported examples the lapse of time from the commencement of violent agitation of one or more of the ingredients in accordance with the invention to the termination of this agitation in accordance with the invention may be as little as 20 seconds when operating under optimum conditions and will be in the neighborhood of, say, 3–5 minutes under usual operating conditions. It has been found that where the ingredients are violently agitated in accordance with the invention, and even allowing for variations in the proportions of the ingredients, in the care with which the operation is performed, or in other factors subject to error, the cellulose will enter into solution within a maximum period of, say, from 15 to 20 minutes from the time of commencement of the agitation. Indeed, it may be generally stated that if the ingredients fail to enter solution within such a period it is because either the proportions are greatly different from those generally included within the above examples or the mixing performed upon the ingredients is without the degree of violent agitation according to the invention.

In general, therefore, violent agitation performed in accordance with the invention can be defined by the result (a substantially fiber-free cuprammonium cellulose solution) being achieved from starting materials (in the proportions encompassed within the preceding paragraphs) within a period of time not more than about 15 to 20 minutes from the time of commencement of the violent agitation of the starting materials.

I claim:

1. A method for preparing a cellulose solution which comprises providing in a container having an agitating member carried by a substantially vertical shaft laterally of the center of the container, a mixture of alpha cellulose, a causticizing agent therefor, a soluble copper compound, water and ammonia to form a copper ammonium complex, violently agitating the mixture by rotating the member while rotating the container in a direction opposite to that of the agitating member to provide a zone of agitation, whereby all parts of the mixture are rapidly and repeatedly brought into and out of the zone of agitation and the ingredients are formed into a substantially fiber-free solution.

2. A method for preparing a cellulose solution which comprises providing in a container having an agitating member carried by a substantially vertical shaft laterally of the center of the container, a mixture of alpha cellulose, an alkali metal causticizing agent therefor, copper sulfate, water and ammonia to form a copper ammonium complex, violently agitating the mixture for a period of from about two minutes to about twenty minutes by rotating the member while rotating the container in a direction opposite to that of the agitating member to provide a zone of agitation, whereby all parts of the mixture are rapidly and repeatedly brought into and out of the zone of agitation and the ingredients are formed into a substantially fiber-free solution.

3. A method for preparing a cellulose solution which comprises providing in a container having an agitating member carried by a substantially vertical shaft laterally of the center of the container, a mixture of alpha cellulose moistened by an aqueous solution of an alkali metal causticizing agent therefor, a soluble inorganic copper compound, water and ammonia to form a copper ammonium complex, violently agitating the mixture by rotating the member while rotating the container in a direction opposite to that of the agitating member, to provide a zone of agitation whereby all parts of the mixture are rapidly and repeatedly brought into and out of the zone of agitation and the ingredients are formed into a substantially fiber-free solution.

4. A method for preparing a cellulose solution which comprises providing in a container having an agitating member carried by a substantially vertical shaft laterally of the center of the container, a mixture in the proportions of one mol of alpha cellulose moistened by an aqueous solution containing from about 2.3 to about 2.7 mols of an alkali metal causticizing agent therefor, from about 1.2 to about 1.4 mols of copper sulfate, from about 144 to about 179 mols of water and from about 12.6 to about 29.5 mols of ammonia to form a copper ammonium complex, violently agitating the mixture by rotating the member while rotating the container in the direction opposite to that of the agitating member to provide a zone of agitation, whereby all parts of the mixture are rapidly and repeatedly brought into and out of the zone of agitation and the ingredients are formed into a substantially fiber-free solution.

EDWARD J. COURTNEY.

References Cited in the file of this patent

UNITED STATES PATENTS

| Number | Name | Date |
| --- | --- | --- |
| 468,805 | Hottman | Feb. 16, 1892 |
| 646,381 | Bronnert | Mar. 27, 1900 |
| 978,878 | Guadagni | Dec. 20, 1910 |
| 1,062,222 | Chaumat | May 20, 1913 |
| 1,869,040 | Bassett | July 26, 1932 |
| 2,021,837 | Davidson | Nov. 19, 1935 |
| 2,225,431 | Furness | Dec. 17, 1940 |
| 2,247,124 | Furness | June 24, 1941 |